(12) United States Patent
Sugamata et al.

(10) Patent No.: US 11,028,788 B2
(45) Date of Patent: Jun. 8, 2021

(54) CONTROL DEVICE FOR INTERNAL-COMBUSTION ENGINE

(71) Applicant: TOYOTA JIDOSHA KABUSHIKI KAISHA, Toyota (JP)

(72) Inventors: Ryohei Sugamata, Okazaki (JP); Takahiro Nishigaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/810,093

(22) Filed: Mar. 5, 2020

(65) Prior Publication Data
US 2020/0318558 A1    Oct. 8, 2020

(30) Foreign Application Priority Data
Apr. 3, 2019    (JP) .............................. JP2019-071151

(51) Int. Cl.
| F02D 41/00 | (2006.01) |
| F02D 19/08 | (2006.01) |
| F02D 41/12 | (2006.01) |

(52) U.S. Cl.
CPC ....... *F02D 41/0002* (2013.01); *F02D 19/084* (2013.01); *F02D 41/123* (2013.01); *F02D 2041/001* (2013.01); *F02D 2200/0404* (2013.01); *F02D 2200/0802* (2013.01)

(58) Field of Classification Search
CPC .. F02D 41/0002; F02D 19/084; F02D 41/123; F02D 2041/001; F02D 2200/0404; F02D 2200/0802

USPC ........................................................ 701/103
See application file for complete search history.

(56) References Cited

U.S. PATENT DOCUMENTS

| 2002/0144500 A1* | 10/2002 | Nakata ................. F02D 41/123 |
| | | 60/277 |
| 2014/0074378 A1* | 3/2014 | Iwai ..................... F02D 41/006 |
| | | 701/104 |
| 2014/0303875 A1 | 10/2014 | Tsukagoshi et al. |
| 2015/0032358 A1* | 1/2015 | Amemiya ........... B60L 15/2054 |
| | | 701/104 |

(Continued)

FOREIGN PATENT DOCUMENTS

| JP | H01-262311 A | 10/1989 |
| JP | H04-232355 A | 8/1992 |

(Continued)

*Primary Examiner* — Joseph J Dallo
*Assistant Examiner* — Yi-Kai Wang
(74) *Attorney, Agent, or Firm* — Oliff PLC

(57) ABSTRACT

A control device for an engine, includes: an air intake controller controlling a quantity of intake air to be supplied to a catalyst provided in an exhaust passage by controlling an open degree of a throttle valve provided in an intake passage; a fuel controller controlling fuel supply to the engine, wherein the fuel controller stops the fuel supply and the air intake controller performs a first control supplying intake air to the catalyst by opening the throttle valve, for a predetermined period of time after an end of the first control, the fuel controller stops the fuel supply, and the air intake controller performs a second control decreasing the open degree of the throttle valve to an open degree smaller than that during the first control, and after the predetermined period of time passes, the fuel controller starts a third control supplying the fuel to the engine.

5 Claims, 5 Drawing Sheets

(56) References Cited

U.S. PATENT DOCUMENTS

| | | | |
|---|---|---|---|
| 2015/0285179 A1* | 10/2015 | Cohn | F02D 41/0007 |
| | | | 701/104 |
| 2020/0256271 A1* | 8/2020 | Sekiguchi | F02D 41/22 |

FOREIGN PATENT DOCUMENTS

| | | |
|---|---|---|
| JP | 2000-087736 A | 3/2000 |
| JP | 2002-371836 A | 12/2002 |
| JP | 2007-276650 A | 10/2007 |
| WO | 2013/065149 A1 | 5/2013 |

* cited by examiner

CONTROL DEVICE FOR INTERNAL-COMBUSTION ENGINE

CROSS-REFERENCE TO RELATED APPLICATION

This application is based upon and claims the benefit of priority of the prior Japanese Patent Application No. 2019-071151, filed on Apr. 3, 2019, the entire contents of which are incorporated herein by reference.

TECHNICAL FIELD

A certain aspect of the embodiments relates to a control device for an internal-combustion engine.

BACKGROUND

To clean up exhaust emissions of the internal-combustion engine, a catalyst is provided in the exhaust passage. However, the temperature of the catalyst may become excessively high temperature. There has been a technique that stops supply of fuel to the internal-combustion engine (fuel cut), increases the open degree of the throttle valve to supply intake air to the catalyst, and thereby decreases the temperature of the catalyst as disclosed in, for example, Japanese Patent Application Publication No. 2002-371836.

SUMMARY

An object of the present disclosure is to provide a control device for an internal-combustion engine capable of reducing shock.

The above object is achieved by a control device for an internal-combustion engine, including: an air intake controller configured to control a quantity of intake air to be supplied to a catalyst provided in an exhaust passage of the internal-combustion engine by controlling an open degree of a throttle valve provided in an intake passage of the internal-combustion engine; a fuel controller configured to control supply of fuel to the internal-combustion engine, wherein the fuel controller stops supply of the fuel and the air intake controller performs a first control that supplies intake air to the catalyst by opening the throttle valve, for a predetermined period of time after an end of the first control, the fuel controller stops the supply of the fuel, and the air intake controller performs a second control that decreases the open degree of the throttle valve to an open degree smaller than an open degree during the first control, and after the predetermined period of time passes, the fuel controller starts a third control that supplies the fuel to the internal-combustion engine.

The internal-combustion engine may include a PCV passage connected to a crank case and the intake passage, the PCV passage introducing blow-by gas from the crank case to the intake passage.

The fuel may contain alcohol.

The control device may further include a position acquisition unit configured to obtain a position of a shift lever of the internal-combustion engine, and when the position of the shift lever becomes a neutral position, the air intake controller may end the first control and performs the second control.

The control device may further include a rotation speed controller configured to control a rotation speed of the internal-combustion engine by an electric motor for the predetermined period of time.

DETAILED DESCRIPTION

As described above, there has been a technique that stops supply of fuel to the internal-combustion engine (fuel cut), increases the open degree of the throttle valve to supply intake air to the catalyst, and thereby decreases the temperature of the catalyst. However, when supply of fuel is started after intake air is supplied in the aforementioned manner, since the amount of intake air in the cylinder is large, the torque of the internal-combustion engine increases, and large shock may occur.

First Embodiment

Hereinafter, with reference to the accompanying drawings, a control device for an internal-combustion engine in accordance with an embodiment will be described. A vehicle and an engine system to which the control device is applied will be described.

Hybrid Vehicle

Figure 1:
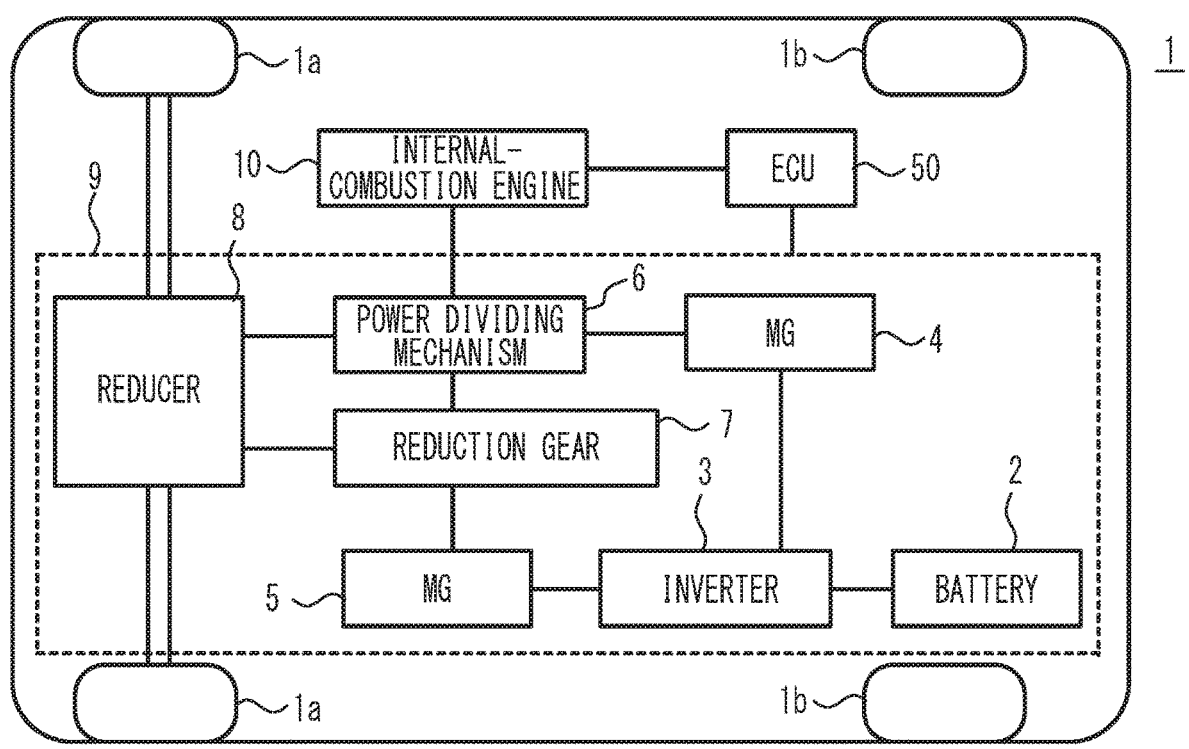
FIG. 1 is a schematic view illustrating a vehicle.

FIG. 1 is a schematic view illustrating a vehicle 1. As illustrated in FIG. 1, the vehicle 1 is a hybrid vehicle on which a hybrid system 9 and an internal-combustion engine 10 (an engine) are installed, and includes drive wheels 1a and 1b. The vehicle 1 may be a plug-in hybrid vehicle of which a battery 2 can be charged by an external power source. The internal-combustion engine 10 generates power by burning fuel. The fuel is, for example, gasoline, or fuel containing gasoline and alcohol.

The hybrid system 9 includes the battery 2, an inverter 3, motor generators (MG, electric motors) 4 and 5, a power dividing mechanism 6, a reduction gear 7, and a reducer 8. The MGs 4 and 5 have a motor function (powering) and a power generation function (regeneration), and are connected to the battery 2 through the inverter 3.

The power dividing mechanism 6 is composed of, for example, a planetary gear mechanism including a sun gear, a planetary gear, and a ring gear, is connected to the internal-combustion engine 10 and the MG 4, and is also connected to the drive wheels 1a through the reducer 8. The power output from the internal-combustion engine 10 is divided by the power dividing mechanism 6 and transmitted to the drive wheels 1a and the MG 4. The reduction gear 7 is connected to the MG 5, and is connected to the drive wheels 1a through the reducer 8. The power output from the MG 5 is transmitted to the drive wheels 1a through the reduction gear 7 and the reducer 8.

The direct-current power discharged from the battery 2 is converted into the alternate-current power by the inverter 3, and is then supplied to the MG 4 or 5. When the battery 2 is charged, the alternate-current power generated by the MG 4 or 5 is converted into the direct-current power by the inverter 3, and is then supplied to the battery 2. A converter that boosts and steps-down the power may be connected to the battery 2. An electronic control unit (ECU) 50 controls the internal-combustion engine 10 and the MGs 4 and 5.

Engine System

Figure 2:
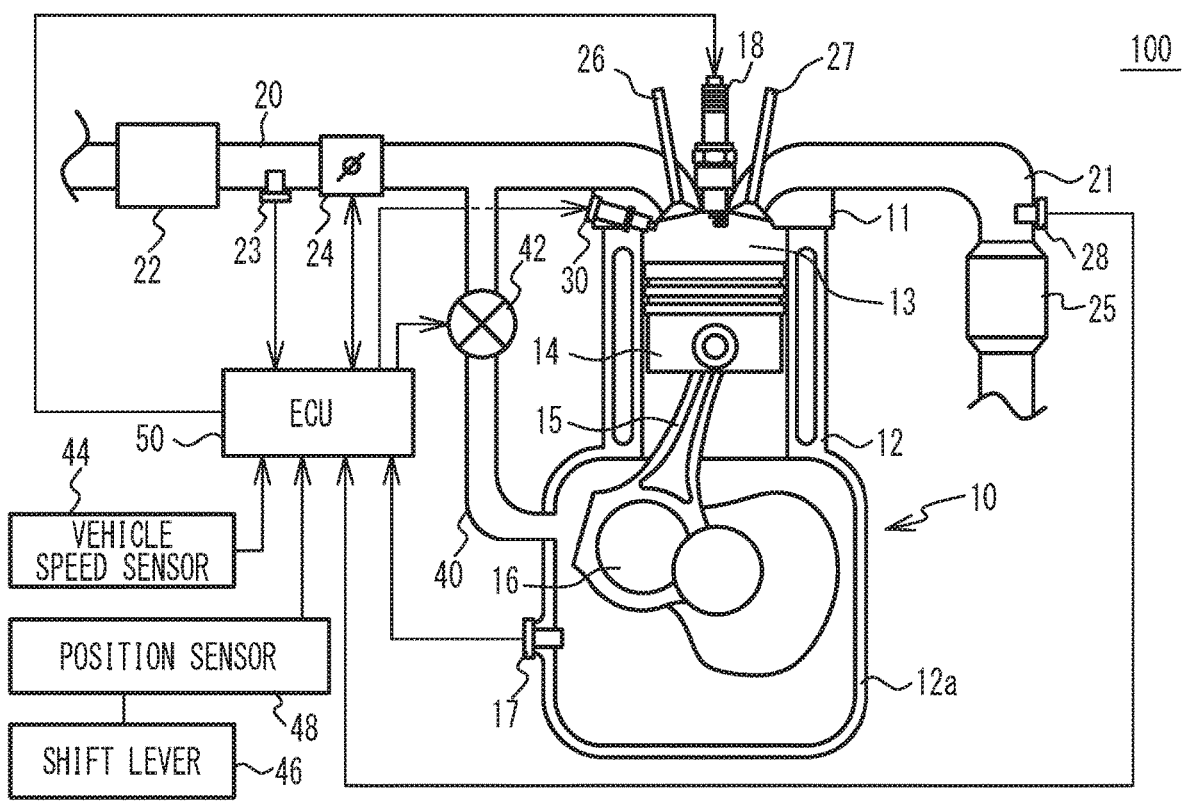
FIG. 2 is a schematic view illustrating an engine system.

FIG. 2 is a schematic view illustrating an engine system 100. The engine system 100 includes the internal-combustion engine 10 and the ECU 50.

The internal-combustion engine 10 includes a cylinder head 11 and a cylinder block 12. A piston 14, a connecting rod 15, and a crankshaft 16 are housed in the cylinder block 12. The cylinder head 11, the cylinder block 12, and the piston 14 form a combustion chamber 13 in the cylinder of the internal-combustion engine 10. The piston 14 is connected to the crankshaft 16 by the connecting rod 15. A spark plug 18, an intake valve 26, an exhaust valve 27, and a fuel injection valve 30 are provided in the cylinder head 11, and an intake passage 20 and an exhaust passage 21 are connected to the cylinder head 11.

In the intake passage 20, an air cleaner 22, an air flow meter 23, and a throttle valve 24 are arranged in this order from the upstream side to the downstream side. The air cleaner 22 filters out dust particles from air flowing in from the outside. The air flow meter 23 obtains the air intake quantity. The throttle valve 24 is driven by, for example, an actuator (not illustrated) to adjust the air intake quantity. As the open degree increases, the air intake quantity increases, while as the open degree decreases, the air intake quantity decreases.

When the intake valve 26 is opened, air is introduced from the intake passage 20 to the combustion chamber 13. Fuel injected from the fuel injection valve 30 and air form air-fuel mixture. The air-fuel mixture is compressed by the piston 14, and ignited by the spark plug 18. Ignition causes the piston 14 to be vertically reciprocated in the combustion chamber 13, thereby rotating the crankshaft 16.

Exhaust gas after combustion is exhausted from the exhaust passage 21.

A catalyst 25 and an air-fuel ratio sensor 28 are provided in the exhaust passage 21. The catalyst 25 is, for example, a ternary catalyst, includes catalyst metals such as platinum (Pt), palladium (Pd), and rhodium (Rh), has an oxygen storage function, and cleans up NOx, HC, and CO. The air-fuel ratio sensor 28 detects the air-fuel ratio. A filter may be provided in the exhaust passage 21.

A first end of a positive crankcase ventilation (PCV) passage 40 is connected to a crank case 12a of the cylinder block 12, and a second end of the PCV passage 40 is connected to the intake passage 20 in a position further downstream than the throttle valve 24. A PCV valve 42 is provided in the middle of the PCV passage 40. Blow-by gas leaking from the combustion chamber 13 to the crank case 12a is supplied to the intake passage 20 through the PCV passage 40, and is introduced into the internal-combustion engine 10 together with intake air. The flow rate of the blow-by gas is adjusted by the open degree of the PCV valve 42.

A crank angle sensor 17 provided to the cylinder block 12 detects the rotation speed of the engine. A vehicle speed sensor 44 detects the speed of the vehicle 1. A shift lever 46 is located near the driver seat, and can be shifted to, for example, a drive (D) range, a neutral (N) range, a reverse (R) range, and a parking (P) range. A position sensor 48 detects the position of the shift lever 46.

The ECU 50 includes a central processing unit (CPU) and storage units such as a random access memory (RAM) and a read only memory (ROM), and performs various controls by executing programs stored in the storage device. The ECU 50 controls the hybrid system 9 and the internal-combustion engine 10, and switches between an EV mode that causes the vehicle 1 to travel only by the power generated by the MG, and an HV mode that causes the vehicle 1 to travel by the power generated by the MG and the internal-combustion engine 10.

The ECU 50 is electrically connected to the crank angle sensor 17, the spark plug 18, the air flow meter 23, the throttle valve 24, the air-fuel ratio sensor 28, the fuel injection valve 30, the PCV valve 42, the vehicle speed sensor 44, and the position sensor 48. The ECU 50 obtains the rotation speed from the crank angle sensor 17, obtains the air intake quantity from the air flow meter 23, obtains the air-fuel ratio from the air-fuel ratio sensor 28, and obtains the vehicle speed from the vehicle speed sensor 44. The ECU 50 controls the ignition timing of the spark plug 18.

The ECU 50 obtains the position of the shift lever 46 from the position sensor 48, and controls the range of the internal-combustion engine 10 according to the obtained position. For example, when the position of the shift lever 46 is in the N (neutral) range, the internal-combustion engine 10 is controlled to be in the N range such that the torque of the internal-combustion engine 10 is not transmitted to the drive wheels 1a and 1b. The ECU 50 has a counting function, and measures the time by counting.

The ECU 50 obtains and controls the open degree of the PCV valve 42.

The ECU 50 functions as an air intake controller that controls the air intake quantity by obtaining the open degree of the throttle valve 24 (the throttle open degree) and controlling the throttle open degree. The ECU 50 functions as a fuel controller that controls the injection timing and the injection quantity of fuel from the fuel injection valve 30.

Figure 3:
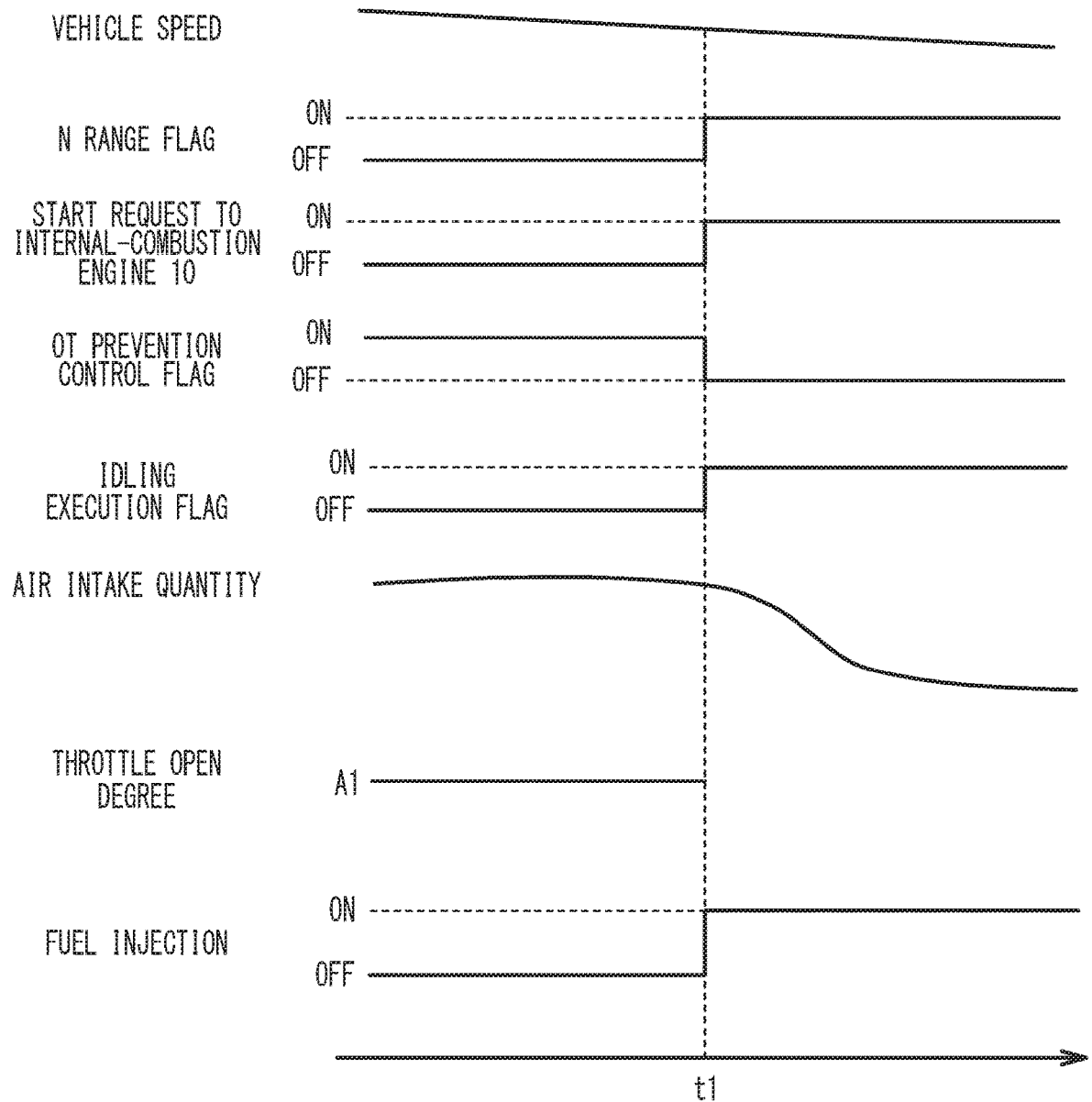
FIG. 3 is a timing chart in a comparative example.
Figure 4:
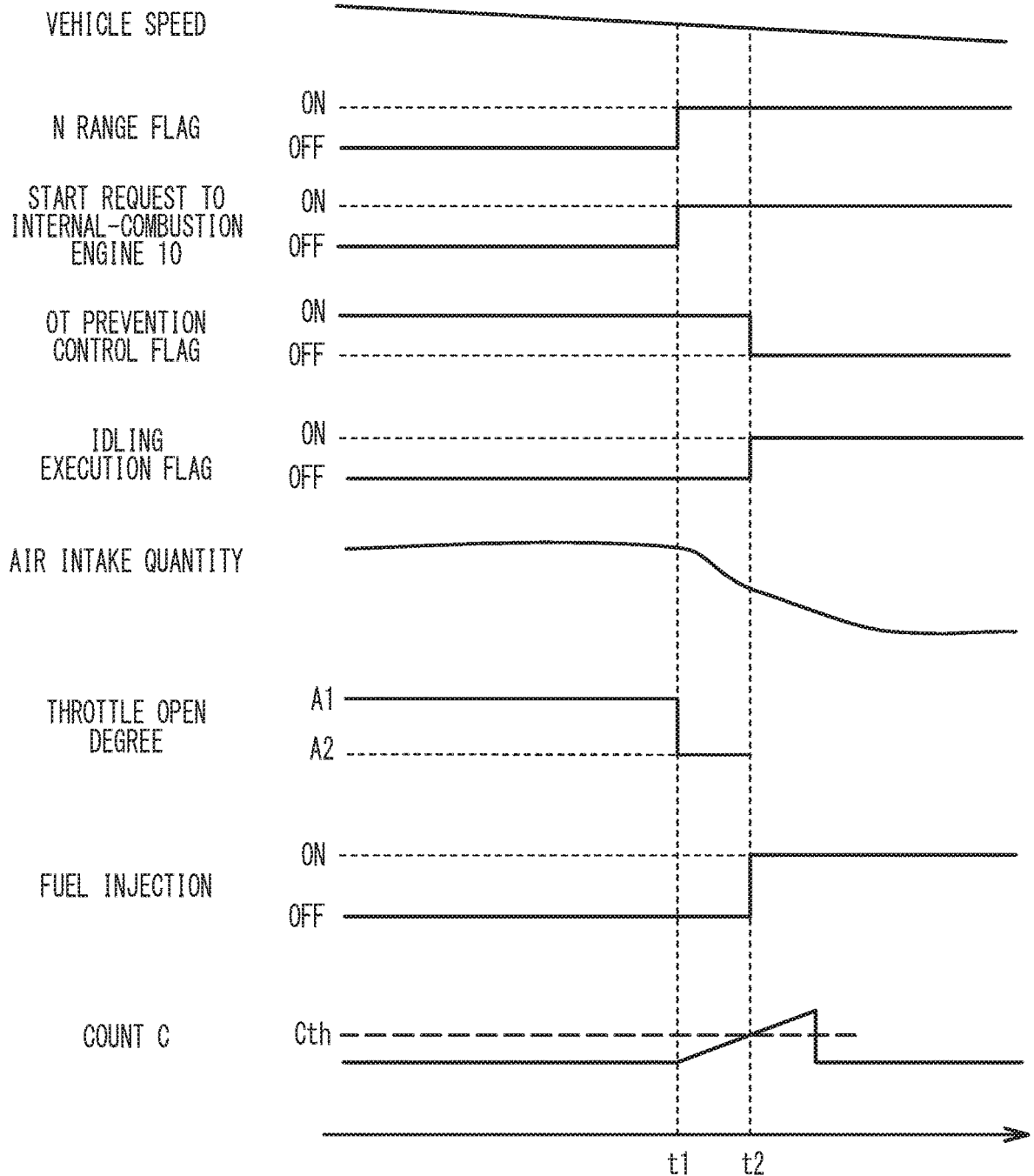
FIG. 4 is a timing chart in a first embodiment.

FIG. 3 is a timing chart in a comparative example. FIG. 4 is a timing chart in the first embodiment. As described later, in the first embodiment, the open degree of the throttle valve 24 is decreased during the period from t1 to t2. The comparative example does not have the period during which the throttle open degree is decreased. In FIG. 3 and FIG. 4, the vehicle speed, an N range flag, a start request to the internal-combustion engine 10, an OT prevention control flag, an idling operation execution flag, the air intake quantity, the throttle open degree, and fuel injection are presented in this order from the top to the bottom. The lowermost part in FIG. 4 presents the count C of the counter.

FIG. 3 and FIG. 4 illustrate the case where the speed of the vehicle 1 decreases. Before the time t1 in FIG. 3 and FIG. 4, the vehicle 1 is slowing down, and fuel injection is stopped (fuel cut, F/C) for engine break.

In the engine system 100 illustrated in FIG. 2, fuel containing alcohol such as ethanol (alcohol fuel) is occasionally used. Since the alcohol fuel is less vaporized than gasoline, it is mixed with lubricating oil, and oil dilution tends to occur. The alcohol component in the fuel mixed with lubricating oil is rapidly vaporized at a temperature around the boiling point. For example, ethanol is rapidly vaporized at 78° C. Such vaporized fuel is mixed with blow-by gas, passes through the PCV passage 40, and joins intake air in the intake passage 20.

During F/C, the intake air flows into the exhaust passage 21 without burning. Vaporized fuel contained in the intake air also flows into the exhaust passage 21, and reaches the catalyst 25. So called catalyst OT, which is increase in the temperature of the catalyst 25 due to the reaction between fuel and oxygen in the catalyst 25, may occur. The catalyst OT may decrease the exhaust gas purification performance of the catalyst 25, deteriorating emission. Therefore, the catalyst 25 is cooled to inhibit the catalyst OT. As in the period before t1 in FIG. 3 and FIG. 4, while the OT prevention control flag is ON, the open degree of the throttle valve 24 is increased to A1 to increase the flow rate of the intake air to cool the catalyst 25 (the catalyst OT prevention control, a first control). This control inhibits the catalyst OT.

For example, the drive of the internal-combustion engine 10 may be started due to the shift to the N range and the anomaly of the hybrid system 9 during F/C. For example, in the examples of FIG. 3 and FIG. 4, the shift lever 46 is set to the N range at time t1, and the N range flag thereby becomes ON. When the start request to the internal-combustion engine 10 becomes ON, the fuel injection and combustion start, the internal-combustion engine 10 executes an idling operation, and the vehicle 1 travels by the drive power of the internal-combustion engine 10.

In the comparative example illustrated in FIG. 3, at time t1, the fuel injection and combustion are performed while the air intake quantity is large. Thus, the torque of the internal-combustion engine 10 increases, and thereby, shock may occur. On the other hand, in the first embodiment illustrated in FIG. 4, before the drive of the internal-combustion engine 10 is started, the open degree of the throttle valve 24 is decreased from A1 to A2 (a second control) in the period from the time t1 to t2. This control decreases the air intake quantity, thereby reducing shock.

Figure 5:
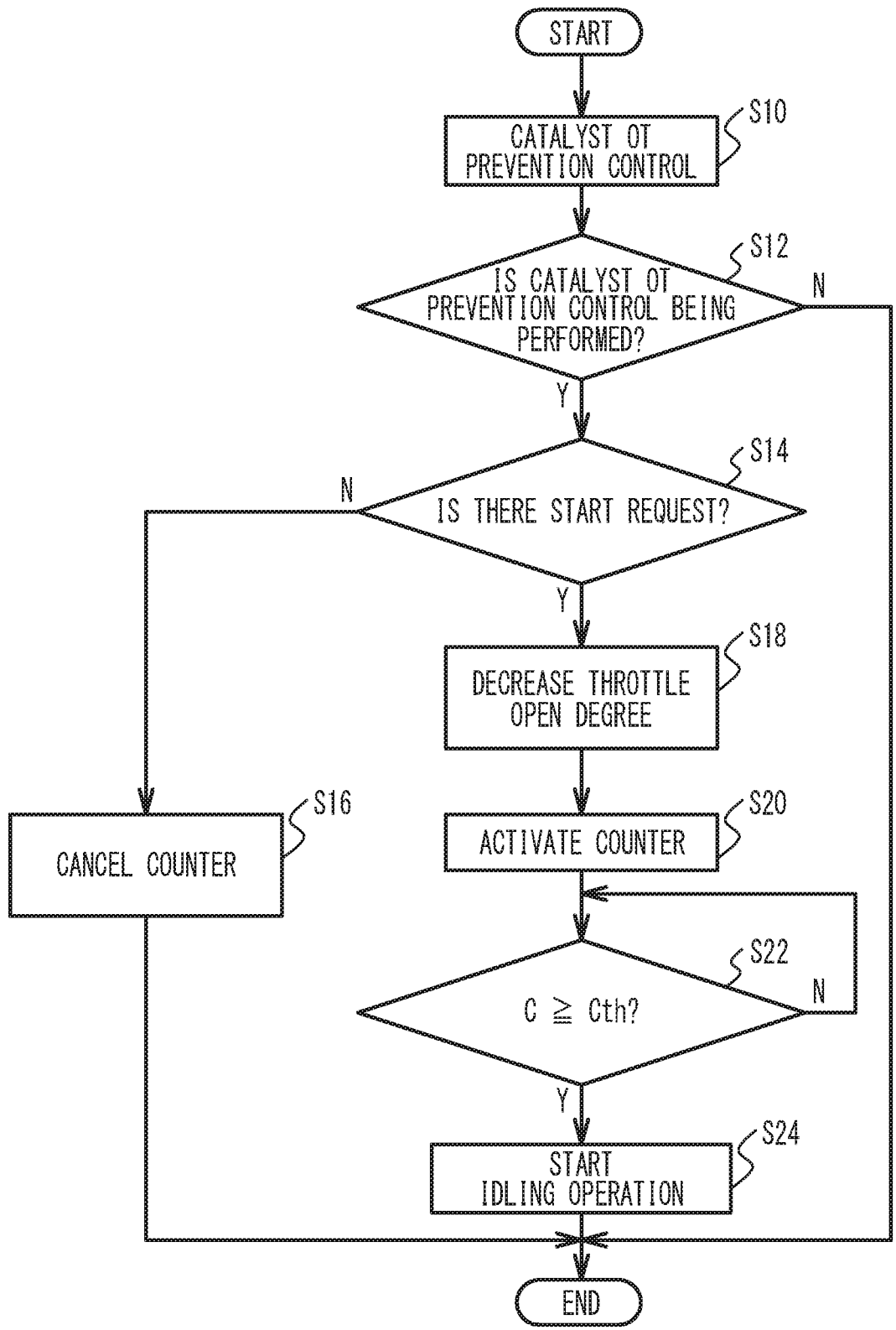
FIG. 5 is a flowchart of a control executed by an ECU.

FIG. 5 is a flowchart of a control executed by the ECU 50. The ECU 50 performs the catalyst OT prevention control by setting the throttle open degree as A1 (step S10). The ECU 50 determines whether the catalyst OT prevention control is being performed (step S12). When the determination is No, the control ends. When the determination is Yes, the ECU 50 determines whether there is a start request to the internal-combustion engine 10 (step S14). When the determination is No, the ECU 50 cancels the counter (step S16), and ends the control. That is, as in the time before the time t1 in FIG. 4, the start request is OFF, and the OT prevention control flag is ON. At this time, since the throttle open degree is A1, the air intake quantity increases, and the catalyst 25 is thereby cooled. The counter does not start counting.

As at time t1 in FIG. 4, for example, when the position of the shift lever 46 becomes in the N range, the start request becomes ON. At this time, the determination at step S14 becomes Yes, and the ECU 50 decreases the throttle open degree from A1 to A2 (step S18, a second control). The ECU 50 activates the counter (step S20), and determines whether the count C of the counter becomes equal to or greater than a predetermined value Cth (step S22). When the determination is No, the ECU 50 repeats step S22. When the determination is Yes, the OT prevention control flag becomes OFF, and the execution flag of the idling operation (the idling operation execution flag) becomes ON, and the ECU 50 starts the idling operation of the internal-combustion engine 10 (step S24, at time t2 in FIG. 4). More specifically, the ECU 50 starts fuel supply by the fuel injection valve 30 and combustion in the combustion chamber 13 (a third control). Thereafter, the control of FIG. 5 ends.

In the first embodiment, the ECU 50 sets the throttle open degree at A1 during F/C to perform the catalyst OT prevention control for cooling the catalyst 25. Thereafter, during the period from t1 to t2, the ECU 50 maintains the throttle open degree at A2 smaller than A1. At time t2, the ECU 50 starts fuel injection and combustion to cause the idling operation of the internal-combustion engine 10. As the throttle open degree is decreased to A2, the air intake quantity decreases. Shock is reduced by starting the idling operation of the internal-combustion engine 10 in a state where the air intake quantity is reduced.

The internal-combustion engine 10 includes the PCV passage 40. Vaporized fuel is mixed with blow-by gas, flows through the PCV passage 40, and is introduced into the internal-combustion engine 10 together with intake air. When the fuel reaches the catalyst 25, the catalyst OT may occur. In particular, fuel containing alcohol is easily mixed with lubricating oil. The alcohol component may be rapidly vaporized at a temperature around the boiling point, and mixed with blow-by gas. In the first embodiment, after executing the catalyst OT prevention control, the ECU 50 sets the throttle open degree at A2 before the idling operation of the internal-combustion engine 10 is started. This control inhibits the catalyst OT, and also reduces shock when the idling operation is started.

For example, when it is difficult for the vehicle to travel in the EV mode because of the anomaly of the hybrid system 9, the internal-combustion engine 10 is started to perform retreat traveling. In this case, the ECU 50 obtains the position of the shift lever 46, and the start request becomes ON when the position of the shift lever 46 becomes in the N range (at time t1 in FIG. 4). The ECU 50 decreases the throttle open degree to A2 before the idling operation is started. This control reduces shock. After the internal-combustion engine 10 is started, the retreat traveling is possible by the power of the internal-combustion engine 10. It is sufficient if the open degree A2 is smaller than A1, and the open degree A2 may be the open degree corresponding to the open degree during the idling operation, or may be the completely closed open degree.

The ECU 50 controls the rotation speed of the internal-combustion engine 10 by the MG 4 between time t1 and time t2, and controls the rotation speed to be, for example, substantially the rotation speed during the idling operation (the idle rotation speed). Thus, at the time of starting the idling operation, the internal-combustion engine 10 operates at the idle rotation speed, and thereby, the engine stop is inhibited. The ECU 50 controls the throttle open degree during the idling operation to the open degree during the operation at the idle rotation speed.

The vehicle 1 may be a vehicle other than the hybrid vehicle, for example, a vehicle powered only by the internal-combustion engine 10. Shock generated by transition from the catalyst OT prevention control to the start of the internal-combustion engine 10 is reduced.

As illustrated in FIG. 4, the air intake quantity is sufficiently decreased during the period from t1 to t2 during which the count C reaches Cth. Thus, the shock is reduced. The ECU 50 may obtain the air intake quantity from, for example, the air flow meter 23, and when the air intake quantity has decreased to a predetermined quantity, the ECU may start the idling operation of the internal-combustion engine 10.

Although some embodiments of the present disclosure have been described in detail, the present disclosure is not limited to the specific embodiments but may be varied or changed within the scope of the present disclosure as claimed.

What is claimed is:

1. A control device for an internal-combustion engine, comprising:
    an air intake controller configured to control a quantity of intake air to be supplied to a catalyst provided in an exhaust passage of the internal-combustion engine by controlling a degree of opening of a throttle valve provided in an intake passage of the internal-combustion engine;

a fuel controller configured to control supply of fuel to the internal-combustion engine, wherein the fuel controller stops supply of the fuel and the air intake controller performs a first control that supplies intake air to the catalyst by opening the throttle valve, when a start request of the internal combustion engine becomes ON, the air intake controller stops the first control, for a predetermined period of time after an end of the first control, the fuel controller stops the supply of the fuel, and the air intake controller performs a second control that decreases the degree of opening of the throttle valve to a degree of opening smaller than a degree of opening during the first control, and after the predetermined period of time passes, the fuel controller starts a third control that supplies the fuel to the internal-combustion engine.

2. The control device according to claim 1, wherein
the internal-combustion engine includes a PCV passage connected to a crank case and the intake passage, the PCV passage introducing blow-by gas from the crank case to the intake passage.

3. The control device according to claim 1, wherein
the fuel contains alcohol.

4. The control device according to claim 1, further comprising:

a position acquisition unit configured to obtain a position of a shift lever of the internal-combustion engine, wherein when the position of the shift lever becomes a neutral position, the air intake controller ends the first control and performs the second control.

5. The control device according to claim 1, further comprising:

a rotation speed controller configured to control a rotation speed of the internal-combustion engine by an electric motor for the predetermined period of time.

* * * * *